(12) United States Patent
Chen et al.

(10) Patent No.: US 7,634,674 B2
(45) Date of Patent: Dec. 15, 2009

(54) POWER REGULATOR CIRCUIT OF A MOTHERBOARD

(75) Inventors: Ying Chen, Shenzhen (CN); Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 183 days.

(21) Appl. No.: 11/954,234

(22) Filed: Dec. 12, 2007

(65) Prior Publication Data
US 2009/0037751 A1    Feb. 5, 2009

(30) Foreign Application Priority Data
Aug. 2, 2007   (CN)   ......................... 2007 1 0201257

(51) Int. Cl.
G06F 1/28    (2006.01)
G06F 1/32    (2006.01)
(52) U.S. Cl. ...................... 713/300; 713/340
(58) Field of Classification Search ................ 713/300, 713/310, 320, 340
See application file for complete search history.

(56) References Cited

U.S. PATENT DOCUMENTS

| | | | | |
|---|---|---|---|---|
| 5,872,983 | A * | 2/1999 | Walsh et al. | 713/300 |
| 6,453,421 | B1* | 9/2002 | Taylor | 713/300 |
| 6,768,222 | B1* | 7/2004 | Ricks | 307/32 |
| 6,952,784 | B1* | 10/2005 | Miller | 713/300 |
| 7,120,811 | B1* | 10/2006 | Bingi et al. | 713/324 |
| 7,512,818 | B2* | 3/2009 | Liu | 713/300 |
| 7,547,996 | B2* | 6/2009 | Lan | 307/154 |
| 7,565,557 | B2* | 7/2009 | Wang et al. | 713/300 |
| 2002/0003740 | A1* | 1/2002 | Chang et al. | 365/226 |
| 2009/0034141 | A1* | 2/2009 | Tonry et al. | 361/92 |

* cited by examiner

Primary Examiner—Gary L Laxton
(74) Attorney, Agent, or Firm—Frank R. Niranjan

(57) ABSTRACT

An exemplary power regulator circuit of motherboard includes a power connector comprising a power supply on pin, a power good pin and a first power pin for being coupled to an ATX power supply, the power good pin providing a first power good signal; an electric switch having a first terminal connected to the power supply on pin of the power connector, a second terminal connected to the power good pin of the power connector, and a grounded third terminal; a diode with the cathode connected to the power good pin of the power connector, and the anode connected to the first power pin of the power connector via a first resistor and grounded via a first capacitor; and an output terminal connected to the anode of the diode to provide a second power good signal.

6 Claims, 1 Drawing Sheet

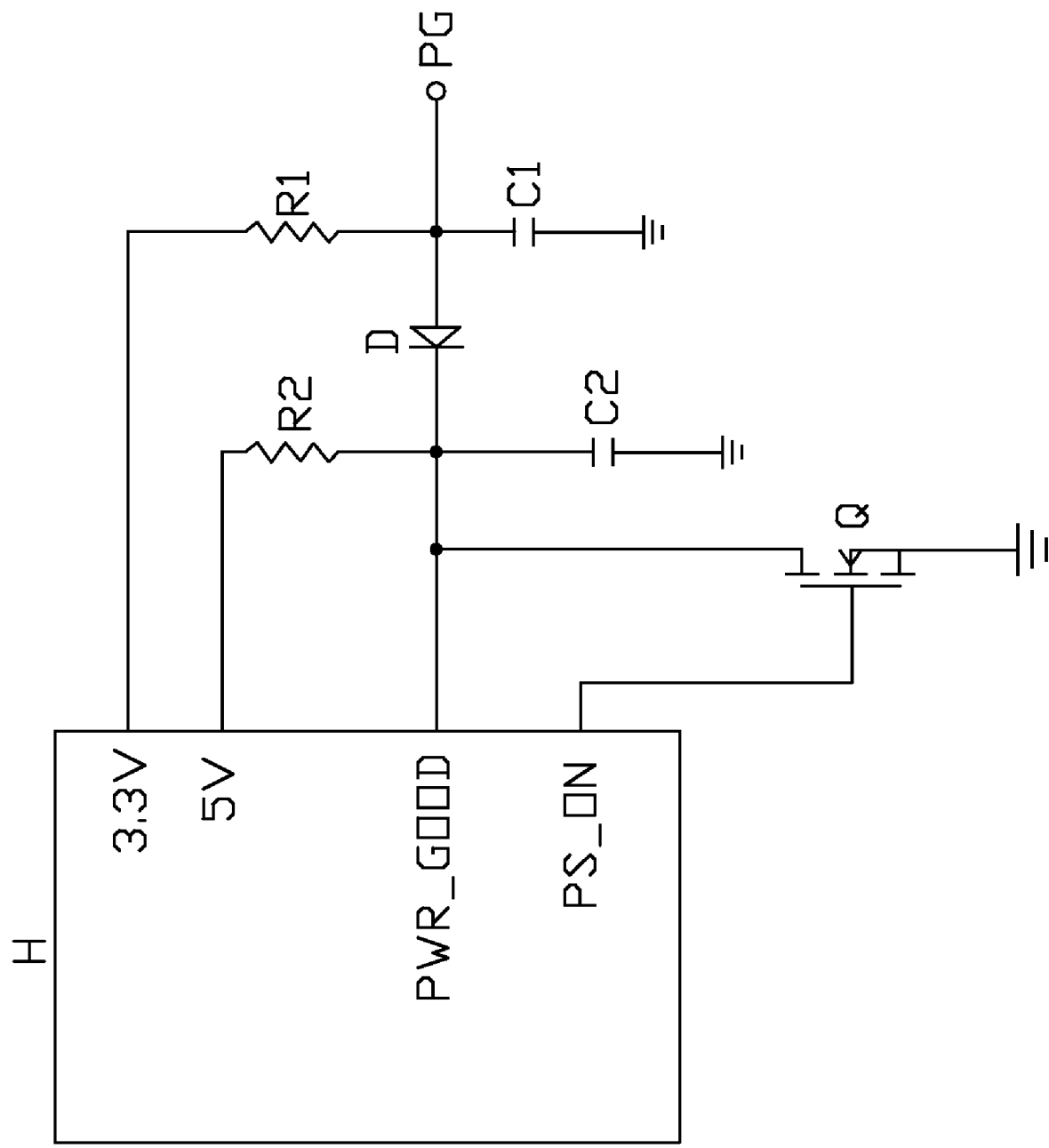

POWER REGULATOR CIRCUIT OF A MOTHERBOARD

BACKGROUND

1. Field of the Invention

The present invention relates to a power regulator circuit of a motherboard.

2. Description of Related Art

A typical microprocessor-cored computer system, such as a personal computer or a workstation computer, is turned on and off by a switch device that mechanically connects/disconnects a power supply of the computer system to/from an external voltage source, such as AC 110V. The power supply is connected to the external voltage source and transforms the external voltage into a predetermined DC level, such as +3.3V, +/−5V and +/−12V, and the computer system is turned on to perform various programs and functions.

As known by a person skilled with computers, the power supply mainly includes ATX power supply and BTX power supply. A motherboard of a computer can be coupled to the ATX power supply via a 20-pin ATX power connector and two 4-pin ATX power connectors. The ATX power supply provides +3.3V, +/−5V, +/−12V, +5V_SB (stand by), PS_ON (power supply on) signal, and PWR_DOOD (power good) signal. When the ATX power supply is turned on, the PS_ON signal is at a low level, and the PWR_GOOD signal is at a high level but there is a delay of 100-500 ms for the other voltages. When the ATX power supply is turned off or put on stand by, the PS_ON signal is at a low level, and +3.3V, +/−5V, +/−12V are turned off.

The PWR_GOOD signal is a 5V TTL (transistor-transistor logic) voltage signal for driving chipsets on a motherboard. But some of the chipsets of the motherboard need a 3.3V driving voltage, therefore the PWR_GOOD signal cannot drive these chipsets.

What is needed is a power regulator circuit for a motherboard which can provide both 5V and 3.3V power good signals to drive chipsets on the motherboard.

SUMMARY

An exemplary power regulator circuit for a motherboard includes a power connector comprising a power supply on pin, a power good pin and a first power pin for being coupled to an ATX power supply, the power good pin providing a first power good signal; an electric switch having a first terminal connected to the power supply on pin of the power connector, a second terminal connected to the power good pin of the power connector, and a grounded third terminal; a diode with the cathode connected to the power good pin of the power connector, and the anode connected to the first power pin of the power connector via a first resistor and grounded via a first capacitor; and an output terminal connected to the anode of the diode to provide a second power good signal.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of a power regulator circuit of a motherboard in accordance with the present invention.

DETAILED DESCRIPTION

Referring to the drawing, a power regulator circuit of motherboard in accordance with an embodiment of the present invention includes a power connector H for coupling to an ATX power supply, an NMOS transistor Q functioning as an electrical switch, a diode D, and an output terminal PG. The power connector H includes a power supply on pin PS_ON, a power good pin PWR_GOOD, a 3.3V power pin, and a 5V power pin. The power good pin PWR_GOOD provides a 5V TTL signal as a power good signal.

The base of the transistor Q is connected to the power supply on pin PS_ON of the power connector H, the drain of the transistor Q is connected to the power good pin PWR_GOOD of the power connector H, and the source of the transistor Q is grounded. The cathode of the diode D is connected to the power good pin PWR_GOOD of the power connector H, the anode of the diode D is connected to the 3.3V power pin of the power connector H via a resistor R1 and grounded via a capacitor C1. The output terminal PG is connected to the anode of the diode to provide a 3.3V power good signal. The power good pin PWR_GOOD of the power connector H is connected to the 5V power pin via a resistor R2 for drawing 5V and grounded via a capacitor C2. A delay time of an RC circuit composed of the resistor R1 and the capacitor C1 is less than 10 ms according to an ATX standard.

When the motherboard is turned on, the power on pin PS_ON of the power connector is at a low level to turn off the transistor Q. At this time the power good pin PWR_GOOD is at a low level to turn on the diode D, therefore, the output terminal PG is at a low level. After 100-500 ms according to the ATX standard, the power good pin PWR_GOOD is at a high level (5V TTL) to turn off the diode D. The capacitor C1 is charged by the 3.3V power pin of the power connector H, and the output terminal PG outputs a 3.3V power good signal when the capacitor C1 finishes charging.

When the motherboard is turned off or in a standby mode, the power on pin PS_ON of the power connector is at a high level to turn on the transistor Q and the diode D. The output terminal PG is at a low level.

The power regulator circuit of motherboard can provide the 5V power good signal via the power good pin PWR_GOOD of the power connector H and the 3.3V power good signal via the output terminal PG to drive chipsets on the motherboard.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power regulator circuit of motherboard comprising:
   a power connector comprising a power supply on pin, a power good pin and a first power pin for being coupled to an ATX power supply, the power good pin providing a first power good signal;
   an electric switch having a first terminal connected to the power supply on pin of the power connector, a second terminal connected to the power good pin of the power connector, and a grounded third terminal;
   a diode with the cathode connected to the power good pin of the power connector, and the anode connected to the first power pin of the power connector via a first resistor and grounded via a first capacitor; and an output terminal connected to the anode of the diode to provide a second power good signal.

2. The power regulator circuit of motherboard as claimed in claim 1, wherein the electric switch is an NMOS transistor, the first, second, and third terminals are gate, drain, and source respectively.

3. The power regulator circuit of motherboard as claimed in claim 1, wherein a delay time of an RC circuit composed of the first resistor and the first capacitor is less than 10 ms.

4. The power regulator circuit of motherboard as claimed in claim 1, wherein the power connector further comprises a second power pin, the power good pin is connected to the second power pin via a second resistor and grounded via a second capacitor.

5. The power regulator circuit of motherboard as claimed in claim 4, wherein the first power pin is a 3.3V power pin, and the second power pin is a 5V power pin.

6. The power regulator circuit of motherboard as claimed in claim 5, wherein the first power good signal is 5V, and the second power good signal is 3.3V.

* * * * *